United States Patent
Jun et al.

(10) Patent No.: US 12,417,882 B2
(45) Date of Patent: Sep. 16, 2025

(54) MULTILAYER ELECTRONIC COMPONENT

(71) Applicant: SAMSUNG ELECTRO-MECHANICS CO., LTD., Suwon-si (KR)

(72) Inventors: Ho In Jun, Suwon-si (KR); Byung Jun Jeon, Suwon-si (KR); Yong Won Seo, Suwon-si (KR); Chae Min Park, Suwon-si (KR); Hyung Duk Yun, Suwon-si (KR); A Ra Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 165 days.

(21) Appl. No.: 18/384,796

(22) Filed: Oct. 27, 2023

(65) Prior Publication Data
US 2024/0212940 A1   Jun. 27, 2024

(30) Foreign Application Priority Data
Dec. 27, 2022  (KR) .................. 10-2022-0185224

(51) Int. Cl.
*H01G 4/30* (2006.01)
*H01G 4/008* (2006.01)
(Continued)

(52) U.S. Cl.
CPC ............. *H01G 4/30* (2013.01); *H01G 4/008* (2013.01); *H01G 4/12* (2013.01); *H01G 4/232* (2013.01)

(58) Field of Classification Search
None
See application file for complete search history.

(56) References Cited

U.S. PATENT DOCUMENTS

| | | | |
|---|---|---|---|
| 4,937,041 A | 6/1990 | Deffeyes | |
| 2008/0118721 A1* | 5/2008 | Horie | H01C 7/18 428/209 |

(Continued)

FOREIGN PATENT DOCUMENTS

| | | | | |
|---|---|---|---|---|
| JP | 3861927 B1 * | 12/2006 | ............. | H01C 1/148 |
| KR | 10-2008-0019053 A | 2/2008 | | |
| KR | 10-2018-0073487 A | 7/2018 | | |

OTHER PUBLICATIONS

Extended European Search Report issued in corresponding European Patent Application No. 23205499.9 dated May 7, 2024.

*Primary Examiner* — Dion R. Ferguson
(74) *Attorney, Agent, or Firm* — MORGAN, LEWIS & BOCKIUS LLP (57) ABSTRACT

A multilayer electronic component includes a body including a first external electrode including a first base plating layer disposed on a third surface of the body and connected to the first internal electrode and a first electrode layer disposed on the first base plating layer, and a second external electrode including a second base plating layer disposed on a fourth surface of the body and connected to the second internal electrode and a second electrode layer disposed on the second base plating layer, wherein the first and second electrode layers include conductive metal and glass, and a 30 μm×5 μm region selected from a cross-section of the first base plating layer in the first and second directions includes three or more Ni grains having a grain size of 4 μm or greater.

21 Claims, 7 Drawing Sheets

(51) Int. Cl.
  *H01G 4/12* (2006.01)
  *H01G 4/232* (2006.01)

(56) References Cited

U.S. PATENT DOCUMENTS

| | | | |
|---|---|---|---|
| 2008/0239617 A1* | 10/2008 | Motoki | H01G 4/30 29/25.42 |
| 2009/0303655 A1 | 12/2009 | Ogawa et al. | |
| 2018/0182552 A1 | 6/2018 | Sawada et al. | |
| 2022/0189699 A1 | 6/2022 | Nomura | |
| 2023/0043869 A1 | 2/2023 | Nakamura et al. | |
| 2024/0212936 A1* | 6/2024 | Jung | H01G 4/2325 |
| 2024/0212940 A1* | 6/2024 | Jun | H01G 4/008 |

* cited by examiner

MULTILAYER ELECTRONIC COMPONENT

CROSS-REFERENCE TO RELATED APPLICATION

The present application claims the benefit of priority to Korean Patent Application No. 10-2022-0185224 filed on Dec. 27, 2022 in the Korean Intellectual Property Office, the disclosure of which is incorporated herein by reference in its entirety.

1. TECHNICAL FIELD

The present disclosure relates to a multilayer electronic component.

2. BACKGROUND

A multilayer ceramic capacitor (MLCC), which is a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease of mounting. As various electronic devices such as computers and mobile devices have been reduced in size and increased in power, demand for miniaturization and high capacitance of multilayer ceramic capacitors have been increased. In addition, as the application of the multilayer ceramic capacitors to automotive electric portions and the like has increased, high reliability in various environments is required.

In order to achieve miniaturization and high capacitance of the multilayer ceramic capacitors, the thickness of dielectric layers and internal electrodes should be reduced to increase the number of stacked layers. As the thickness of the internal electrodes becomes thinner and the number of layers increases, diffusion between Cu of external electrodes and Ni of the internal electrodes may increase, which may cause volume expansion of a body. This may stress a thin dielectric layer and cause radiation cracks. In addition, as the internal electrodes becomes thinner, the shrinkage of the internal electrodes may increase, and thus, connectivity between the internal electrodes and the external electrodes may deteriorate.

Therefore, there is a need to develop a multilayer ceramic capacitor having a structure capable of suppressing radiation cracks and improving connectivity between internal electrodes and external electrodes.

SUMMARY

An aspect of the present disclosure may provide a multilayer electronic component having excellent reliability.

An aspect of the present disclosure may also provide a multilayer electronic component in which radiation cracks that occur in a body is suppressed.

An aspect of the present disclosure may also provide a multilayer electronic component in which connectivity between internal electrodes and external electrodes is improved.

An aspect of the present disclosure may also provide a multilayer electronic component in which penetration of hydrogen into a body is suppressed.

According to an aspect of the present disclosure, a multilayer electronic component includes: a body including a dielectric layer and first and second internal electrodes alternately disposed in a first direction with the dielectric layer interposed therebetween and including first and second surfaces facing in the first direction, third and fourth surfaces connected to the first and second surfaces and facing in a second direction, and fifth and sixth surfaces connected to the first to fourth surfaces and facing in a third direction; a first external electrode including a first base plating layer disposed on the third surface and connected to the first internal electrode and a first electrode layer disposed on the first base plating layer; and a second external electrode including a second base plating layer disposed on the fourth surface and connected to the second internal electrode and a second electrode layer disposed on the second base plating layer, wherein the first and second electrode layers include conductive metal and glass, and a 30 μm×5 μm region selected from a cross-section of the first base plating layer in the first and second directions includes three or more Ni grains having a grain size of 4 μm or greater.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawing, a first direction may be defined as a stacking direction or a thickness (T) direction, a second direction may be defined as a length (L) direction, and a third direction may be defined as a width (W) direction.

Multilayer Electronic Component

Figure 1:
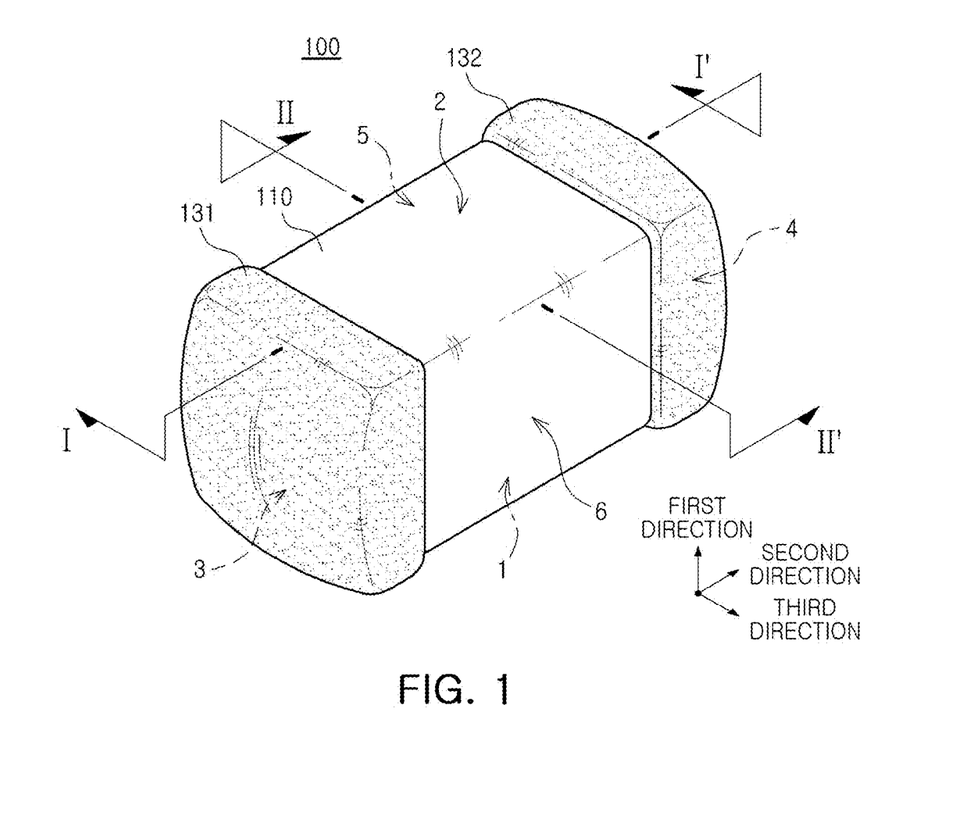
FIG. 1 is a perspective view schematically illustrating a multilayer electronic component according to an exemplary embodiment in the present disclosure.

FIG. 1 is a perspective view schematically illustrating a multilayer electronic component according to an exemplary embodiment in the present disclosure.

Figure 2:
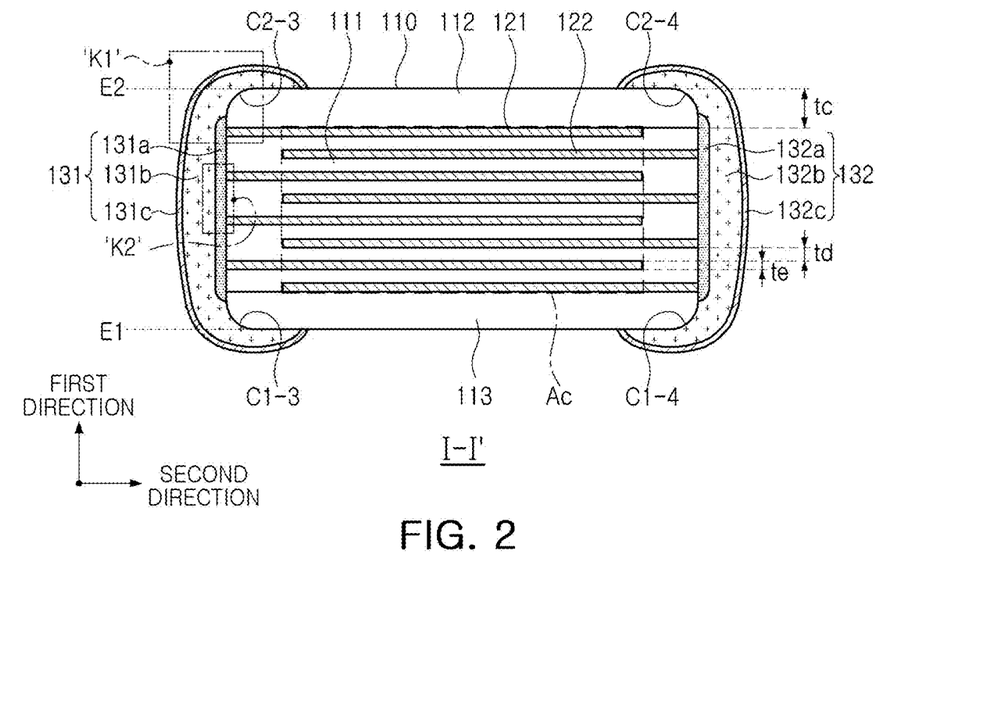
FIG. 2 is a cross-sectional view, taken along line I-I' of FIG. 1.

FIG. 2 is a cross-sectional view, taken along line I-I' of FIG. 1.

Figure 3:
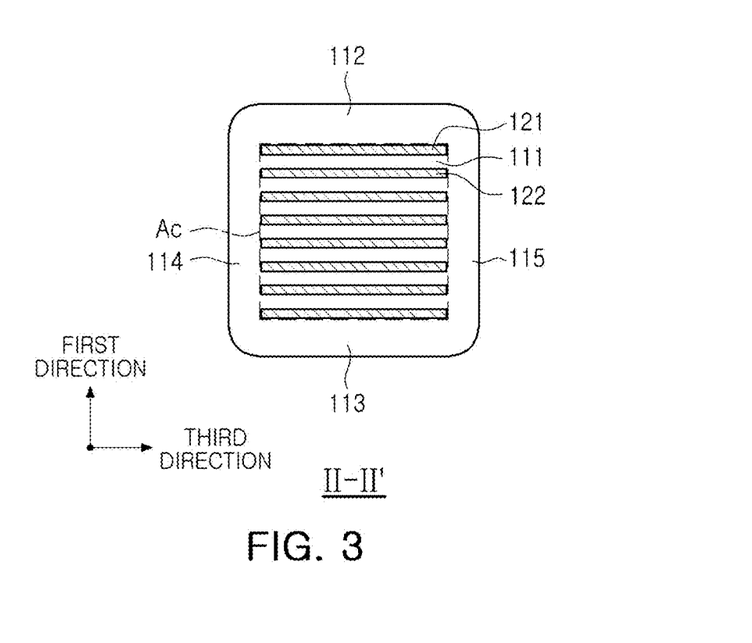
FIG. 3 is a cross-sectional view, taken along line II-II' of FIG. 1.

FIG. 3 is a cross-sectional view, taken along line II-II' of FIG. 1.

Figure 4:
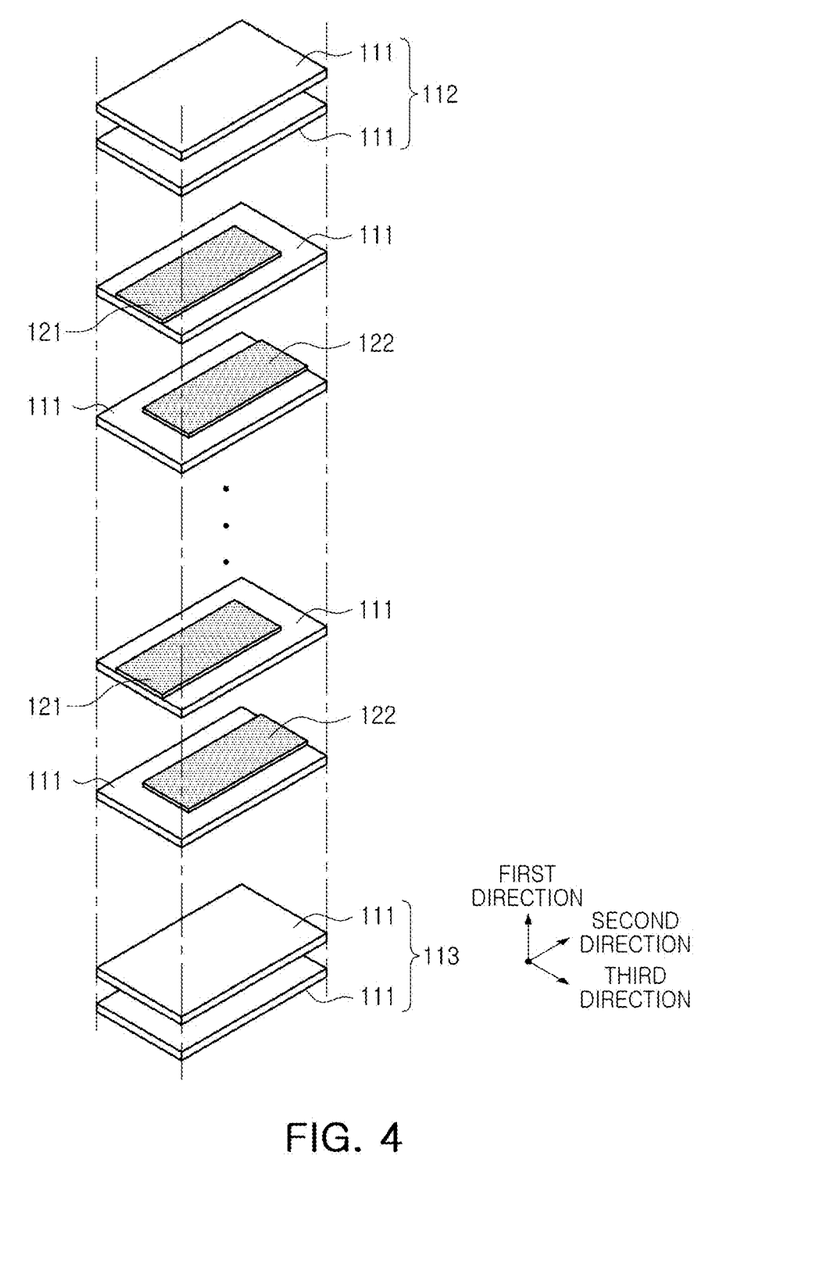
FIG. 4 is an exploded perspective view schematically illustrating a disassembled body of FIG. 1.

FIG. 4 is an exploded perspective view schematically illustrating a disassembled body of FIG. 1.

Figure 5:
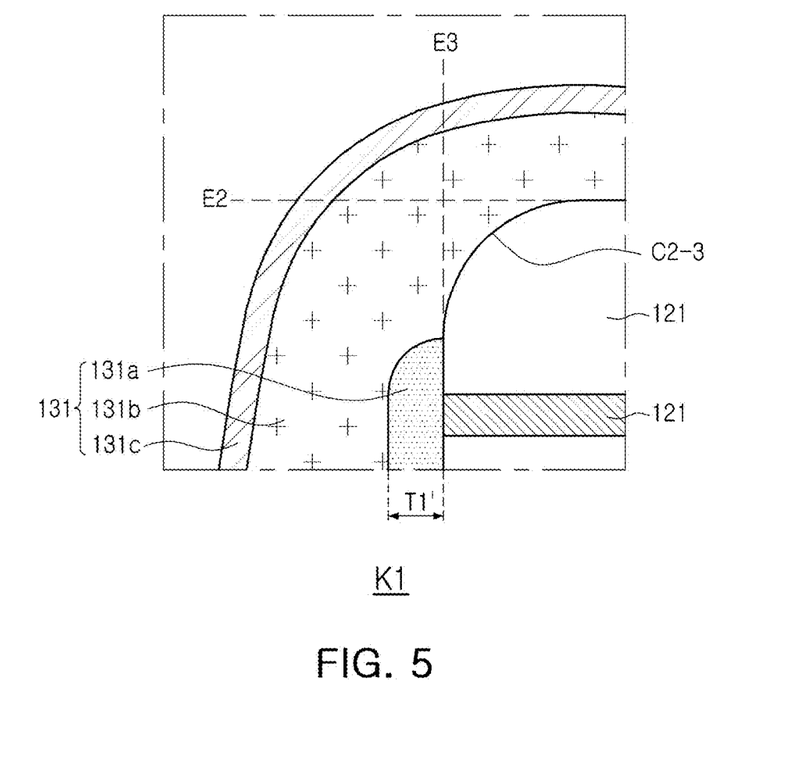
FIG. 5 is an enlarged view of region K1 of FIG. 2.

FIG. 5 is an enlarged view of region K1 of FIG. 2.

Figure 6:
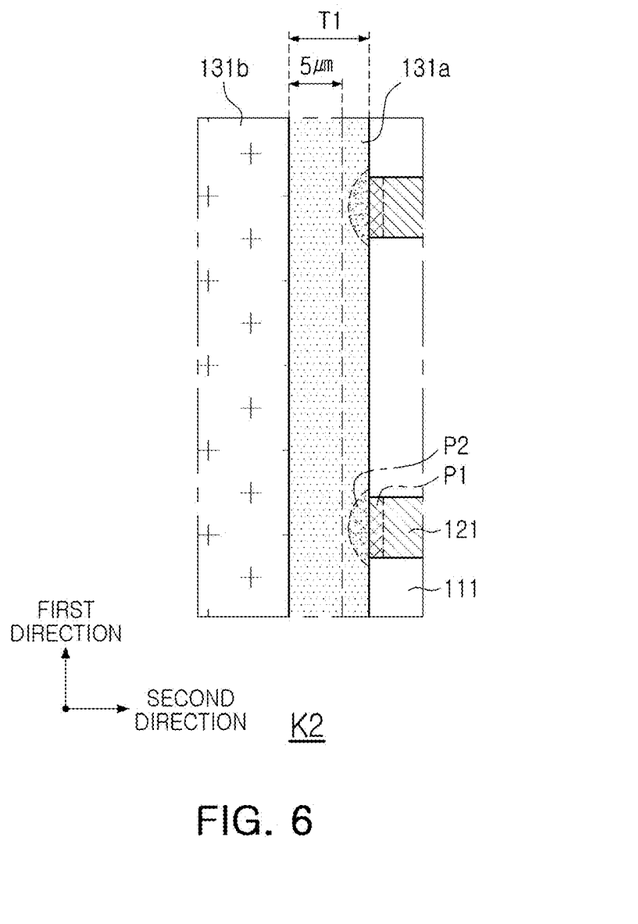
FIG. 6 is an enlarged view of region K2 of FIG. 2.

FIG. 6 is an enlarged view of region K2 of FIG. 2.

Hereinafter, a multilayer electronic component 100 according to an exemplary embodiment in the present disclosure will be described in detail with reference to FIGS. 1 through 6. In addition, a multilayer ceramic capacitor (MLCC) will be described as an example of a multilayer electronic component, but the present disclosure is not limited thereto and may be applied to various multilayer electronic components, such as inductors, piezoelectric devices, varistors, or thermistors.

The multilayer electronic component 100 according to an exemplary embodiment in the present disclosure may include a body 110 including a dielectric layer 111 and first and second internal electrodes 121 and 122 alternately disposed in a first direction with the dielectric layer interposed therebetween and including first and second surfaces 1 and 2 facing in the first direction, third and fourth surfaces 3 and 4 connected to the first and second surfaces and facing in a second direction, and fifth and sixth surfaces 5 and 6 connected to the first to fourth surfaces and facing in a third direction; a first external electrode 131 including a first base plating layer 131a disposed on the third surface and connected to the first internal electrode and a first electrode layer 131b disposed on the first base plating layer; and a second external electrode 132 including a second base plating layer 132a disposed on the fourth surface and connected to the second internal electrode 122 and a second electrode layer 132b disposed on the second base plating layer, wherein the first and second electrode layers 131b and 132b may include conductive metal and glass, and a 30 μm×5 μm region selected from a cross-section of the first base plating layer 131a in the first and second directions may include three or more Ni grains having a grain size of 4 μm or greater.

In a general multilayer ceramic capacitor of the related art, ceramic green sheets coated with internal electrode paste are laminated and then sintered to form a body, and a paste including Cu and glass is applied to the body and fired to form external electrodes on the body. However, during the sintering process, the internal electrodes may be formed in a shape that is recessed into the body due to shrinkage of the internal electrodes, so there is a problem in that connectivity between the internal electrodes and the external electrodes may deteriorate. In addition, during the firing process, Cu from the external electrode may diffuse into the internal electrodes to induce volume expansion of the body, thereby increasing stress applied to the body and causing radiation cracks in the body. Furthermore, as the thickness of the dielectric layer and the internal electrodes is reduced to achieve miniaturization and high capacitance, the problem of connectivity between the internal electrodes and external electrodes and the problem of the occurrence of radiation cracks in the body may be intensified.

Meanwhile, according to an exemplary embodiment in the present disclosure, the base plating layers 131a and 132a are disposed between the internal electrodes 121 and 122 and the electrode layers 131b and 132b, and the base plating layers 131a and 132a include Ni grains having a large grain size, thereby suppressing diffusion of a metal element included in the electrode layers 131b and 132b into the internal electrodes and improving the connectivity between the internal electrodes 121 and 122 and the external electrodes 131 and 132. In addition, penetration of hydrogen into the body 110 may be suppressed.

Hereinafter, each component included in the multilayer electronic component 100 according to an exemplary embodiment in the present disclosure will be described.

In the body 110, the dielectric layers 111 and the internal electrodes 121 and 122 are alternately stacked.

Although the specific shape of the body 110 is not particularly limited, the body 110 may have a hexahedral shape or a shape similar thereto as illustrated. Due to the shrinkage of ceramic powder included in the body 110 during a sintering process, the body 110 may not have a perfectly straight hexahedral shape but may have a substantially hexahedral shape. The body 110 may have first and second surfaces 1 and 2 facing each other in the first direction, third and fourth surfaces 3 and 4 connected to the first and second surfaces 1 and 2 and facing each other in the second direction, and fifth and sixth surfaces 5 and 6 connected to the first and second surfaces 1 and 2 and connected to the third and fourth surfaces 3 and 4 and facing each other in the third direction.

In an exemplary embodiment, the body 110 may include 1-3 corners (c1-3) connecting the first surface and the third surface, 1-4 corners (c1-4) connecting the first surface and the fourth surface, 2-3 corners (c2-3) connecting the second surface and the third surface, and 2-4 corners (c2-4) connecting the second surface and the fourth surface, and at least one of the 1-3 corners and at least one of the 2-3 corners are contracted to the center of the body in the first direction toward the third surface, and at least one of the 1-4 corners and at least one of the 2-4 corners are contracted to the center of the body in the first direction toward the fourth surface.

As a margin region in which the internal electrodes 121 and 122 are not disposed overlaps the dielectric layer 111, a step difference occurs due to a thickness of the internal electrodes 121 and 122 so that the corners connecting the first surface to the third to fifth surfaces and/or the corners connecting the second surface to the third to fifth surfaces may be contracted toward the center of the body 110 in the first direction with respect to the first surface or the second surface. Alternatively, at least one of the corners connecting the first surface 1 to the third to sixth surfaces 3, 4, 5, and 6 and/or at least one of the corners connecting the second surface 2 to the third to sixth surfaces 3, 4, 5, and 6 may be contracted toward the center of the body 110 in the first direction with respect to the first or second surface. Alternatively, as the corners connecting each surface of the body 110 are subject to a separate process to prevent chipping defects, at least one of the corners connecting the first surface to the third to sixth surfaces and/or at least one of the corners connecting the second surface to the third to sixth surfaces may have a round shape.

The corners may include the 1-3 corners connecting the first surface and the third surface, the 1-4 corners connecting the first surface and the fourth surface, the 2-3 corners connecting the second surface and the third surface, and the 2-4 corners connecting the second surface and the fourth surface. In addition, the corners may include at least one of 1-5 corners connecting the first surface and the fifth surface, at least one of 1-6 corners connecting the first surface and the sixth surface, at least one of 2-5 corners connecting the second surface and the fifth surface, and at least one of 2-6 corners connecting the second surface and the sixth surface. The first to sixth surfaces of the body 110 may be generally flat surfaces, and non-flat regions may be regarded as corners. Hereinafter, an extension line of each surface may refer to a line extending based on a flat portion of each surface.

Meanwhile, in order to suppress the step difference caused by the internal electrodes 121 and 122, when the margin portions 114 and 115 are formed by cutting the body so that the internal electrodes are exposed to the fifth and sixth surfaces 5 and 6 after stacking, and then stacking a single dielectric layer or two or more dielectric layers on both side surfaces of the capacitance forming portion Ac, the portion in which the first surface is connected to the fifth and sixth surfaces and the portion in which the second surface is connected to the fifth and sixth surfaces may not be contracted.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient capacitance may be obtained. For example, a barium titanate-based material, a lead composite perovskite-based material, or a strontium titanate-based material may be used. The barium titanate-based material may include $BaTiO_3$-based ceramic powder, and examples of the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) in which Ca, Zr, etc. is partially dissolved in $BaTiO_3$.

In addition, as a material for forming the dielectric layer 111, various ceramic additives, organic solvents, binders, dispersants, etc. may be added to the powder of barium titanate ($BaTiO_3$) according to purposes of the present disclosure.

Meanwhile, the thickness of the dielectric layer 111 may not be particularly limited.

However, in general, when the dielectric layer is formed thinly with a thickness less than 0.6 μm, in particular, when the thickness of the dielectric layer is 0.35 μm or less, the dielectric layer 111 may be vulnerable to stress.

According to an exemplary embodiment in the present disclosure, the base plating layers 131a and 132a may be disposed between the internal electrodes 121 and 122 and the electrode layers 131b and 132b, respectively, and Ni grains having a large grain size may be included in the base plating layers 131a and 132a, thereby diffusion of the electrode layers 131b and 132b into the internal electrodes 121 and 122 may be suppressed to minimize volume expansion and a consequent occurrence of stress, so that excellent reliability may be secured even when an average thickness td of at least one of the plurality of dielectric layers 111 is 0.35 μm or less.

Therefore, when the average thickness td of at least one of the plurality of dielectric layers 111 is 0.35 μm or less, the reliability improvement effect according to the present disclosure may be more remarkable.

The average thickness td of the dielectric layer 111 may refer to an average size of the dielectric layer 111 disposed between the first and second internal electrodes 121 and 122 in the first direction.

The average thickness of the dielectric layer 111 may be measured by scanning an image of a cross-section of the body 110 in the length and thickness directions (L-T) with a scanning electron microscope (SEM) with magnification of 10,000. More specifically, thicknesses at 30 equally spaced points of one dielectric layer in the length direction in the scanned image may be measured and an average value thereof may be measured. The 30 equally spaced points may be designated in the capacitance forming portion Ac. In addition, when an average value is measured by extending the average value measurement to 10 dielectric layers, the average thickness of the dielectric layer may be further generalized.

The body 110 may include a capacitance forming portion Ac forming capacitance by including the first internal electrodes 121 and the second internal electrodes 122 disposed to face each other with the dielectric layer 111 interposed therebetween and cover portions 112 and 113 formed above and below the capacitance forming portion Ac in the first direction.

In addition, the capacitance forming portion Ac, which contributes to forming the capacitance of the capacitor, may be formed by repeatedly stacking a plurality of first and second internal electrodes 121 and 122 with the dielectric layer 111 interposed therebetween.

The cover portions 112 and 113 may include an upper cover portion 112 disposed on a top of the capacitance forming portion Ac in the first direction and a lower cover portion 113 disposed on a bottom of the capacitance forming portion Ac in the first direction.

The upper cover portion 112 and the lower cover portion 113 may be formed by stacking a single dielectric layer or two or more dielectric layers on the top and bottom surfaces of the capacitance forming portion Ac in the thickness direction, respectively, and may basically serve to prevent damage to the internal electrode due to are physical or chemical stress.

The upper cover portion 112 and the lower cover portion 113 may not include internal electrodes and may include the same material as the dielectric layer 111.

That is, the upper cover portion 112 and the lower cover portion 113 may include a ceramic material, for example, a barium titanate ($BaTiO_3$)—based ceramic material.

Meanwhile, the thicknesses of the upper and lower cover portions 112 and 113 may not be particularly limited, and may be the same or different to each other. However, the thicknesses tc of the upper and lower cover portions 112 and 113 may be 15 μm or less in order to more easily achieve miniaturization and high capacitance of the multilayer electronic component.

The average thickness tc of the cover portions 112 and 113 may refer to a size in the first direction and may be an average value of sizes of the cover portions 112 and 113 measured from five points at equal intervals above or below the capacitance forming portion Ac in the first direction.

In addition, margin portions 114 and 115 may be disposed on side surfaces of the capacitance forming portion Ac.

The margin portions 114 and 115 may include a first margin portion 114 disposed on the fifth surface 5 of the body 110 and a second margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to regions between both ends of the first and second internal electrodes 121 and 122 in a cross-section of the body 110 cut in the width-thickness (W-T) direction and a boundary surface of the body 110.

The margin portions 114 and 115 may basically serve to prevent damage to the internal electrode due to physical or chemical stress.

The margin portions 114 and 115 may be formed by forming internal electrodes by applying a conductive paste on the ceramic green sheet except a portion in which the margin portion is to be formed.

In addition, in order to suppress a step difference caused by the internal electrodes 121 and 122, after stacking, the internal electrodes 121 and 122 may be cut to be exposed to the fifth and sixth surfaces 5 and 6 of the body, and then a single dielectric layer or two or more dielectric layers may be stacked on both side surfaces of the capacitance forming portion Ac in the third direction (the width direction) to form the margin portions 114 and 115.

Meanwhile, the widths of the margin portions 114 and 115 may not be particularly limited. However, an average width of the margin portions 114 and 115 may be 15 µm or less in order to more easily achieve miniaturization and high capacitance of the multilayer electronic component.

An average width of the margin portions 114 and 115 may refer to an average size of a region in which the internal electrode is spaced apart from the fifth surface in the third direction and an average size of a region in which the internal electrode is spaced apart from the sixth surface in the third direction, and may be an average value of sizes of the margin portions 114 and 115 in the third direction measured at five equally spaced points on the side surface of the capacitance forming portion Ac.

Therefore, in an exemplary embodiment, each of the average sizes of the regions in which the internal electrodes 121 and 122 are spaced apart from the fifth and sixth surfaces in the third direction may be 15 µm or less.

The internal electrodes 121 and 122 may include first and second internal electrodes 121 and 122. The first and second internal electrodes 121 and 122 may be alternately disposed to face each other with the dielectric layer 111 constituting the body 110 interposed therebetween, and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body and connected to the first internal electrode 121, and the second external electrode 132 may be disposed on the fourth surface 4 of the body and connected to the second internal electrode 122.

That is, the first internal electrode 121 may not be connected to the second external electrode 132 but be connected to the first external electrode 131, and the second internal electrode 122 may not be connected to the first external electrode 131 but be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. Also, the first and second internal electrodes 121 and 122 may be spaced apart from the fifth and sixth surfaces of the body 110.

In this case, the first and second internal electrodes 121 and 122 may be electrically separated from each other by the dielectric layer 111 disposed therebetween.

The body 110 may be formed by alternately stacking ceramic green sheets on which the first internal electrodes 121 are printed and ceramic green sheets on which the second internal electrodes 122 are printed, and then firing the ceramic green sheets.

Materials forming the internal electrodes 121 and 122 are not particularly limited, and materials having excellent electrical conductivity may be used. For example, the internal electrodes 121 and 122 may include one or more of Nickel (Ni), copper cu), palladium (Pd), silver (Ag), gold (Au), platinum (Pt), tin (Sn), tungsten (W), titanium (Ti), indium (In), aluminum (Al), and alloys thereof.

In addition, the internal electrodes 121 and 122 may be formed by printing a conductive paste for internal electrodes including one or more of Nickel (Ni), copper (Cu), palladium (Pd), silver (Ag), gold (Au), platinum (Pt), tin (Sn), tungsten (W), titanium (Ti), indium (In), aluminum (Al), and alloys thereof on a ceramic green sheet. A screen printing method or a gravure printing method may be used as a method of printing the conductive paste for internal electrodes, but the present disclosure is not limited thereto.

Meanwhile, thicknesses of the internal electrodes 121 and 122 may not be particularly limited.

However, in general, if the thickness of the internal electrode is less than 0.6 µm, and in particular, when the thickness of the internal electrode is 0.35 µm or less, reliability may be deteriorated.

According to an exemplary embodiment in the present disclosure, since the base plating layers 131a and 132a are disposed between the internal electrodes 121 and 122 and the electrode layers 131b and 132b, respectively, and Ni grains having a large grain size are included in the base plating layers 131a and 132a, reliability may be improved, and therefore, excellent reliability may be secured even when the average thickness te of at least one of the plurality of internal electrodes 121 and 122 is 0.35 µm or less.

Therefore, when the average thickness te of at least one of the plurality of internal electrodes 121 and 122 is 0.35 µm or less, the effect according to the present disclosure may be more remarkable, and miniaturization and high capacitance of the multilayer electronic component may be more easily achieved.

The average thickness te of the internal electrodes 121 and 122 may refer to an average size of the internal electrodes 121 and 122 in the first direction.

The average thickness of the internal electrodes 121 and 122 may be measured by scanning an image of a cross-section of the body 110 in the length and thickness directions (L-T) with a scanning electron microscope (SEM) with magnification of 10,000. More specifically, an average value may be measured by measuring the thicknesses of one internal electrode at 30 equally spaced points in the length direction in the scanned image. The 30 equally spaced points may be designated in the capacitance forming portion Ac. In addition, when the average value is measured by extending the average value measurement to ten internal electrodes, the average thickness of the internal electrodes may be further generalized.

The external electrodes 131 and 132 may be disposed on the third and fourth surfaces 3 and 4 of the body 110.

The external electrodes 131 and 132 may include the first and second external electrodes 131 and 132 disposed on the third and fourth surfaces 3 and 4 of the body 110 and connected to the first and second internal electrodes 121 and 122, respectively.

Meanwhile, in the present exemplary embodiment, although the structure in which the multilayer electronic component 100 has two external electrodes 131 and 132 is described, the number and shape of the external electrodes 131 and 132 may be changed according to the shape of the internal electrodes 121 and 122 or other purposes.

The external electrodes 131 and 132 may include base plating layers 131a and 132a connected to the internal electrodes 121 and 122 and electrode layers 131b and 132b disposed on the base plating layers 131a and 132a, respectively. The first external electrode 131 may include: the first base plating layer 131a disposed on the third surface and connected to the first internal electrode 121; and the first electrode layer 131b disposed on the first base plating layer. The second external electrode 132 may include: the second base plating layer 132a disposed on the fourth surface and connected to the second internal electrode; and the second electrode layer 132b disposed on the second base plating layer.

A region of 30 μm×5 μm selected from a cross-section of the first base plating layer 131a in the first and second directions may include three or more Ni grains having a grain size of 4 μm or greater. Here, Ni grains partially observed to be included in the 30 μm×5 μm region are also considered to be included in the 30 μm×5 μm region, and a total grain size of the Ni grains partially included in the 30 μm×5 μm region may be regarded as the grain size of the Ni grains. Meanwhile, the second base plating layer 132a is symmetrical to the first base plating layer 131a in the second direction, and the characteristics related to the Ni grains of the first base plating layer 131a are also equally applied to the second base plating layer 132a.

As the 30 μm×5 μm region selected from the cross-section of the first base plating layer 131a in the first and second directions includes three or more Ni grains having a grain size of 4 μm or greater, the region may serve to suppress diffusion of metal elements included in the electrode layers 131b and 132b to the internal electrodes 121 and 122. In addition, as the internal electrodes 121 and 122 are contracted, the end portions of the internal electrodes to be connected to the external electrodes 131 and 132 may be recessed inwardly to the body relative to the surface of the body, thereby degrading connectivity with the external electrodes 131 and 132. However, since the base plating layers 131a and 132a may be easily connected to the end portions of the internal electrodes recessed inwardly relative to the surface of the body, connectivity between the internal electrodes 121 and 122 and the external electrodes 131 and 132 may be improved. In addition, the base plating layers 131a and 132a may serve to suppress hydrogen from penetrating into the body 110.

If the 30 μm×5 μm region selected from the cross-section of the first base plating layer 131a in the first and second directions includes less than three Ni grains having a grain size of 4 μm or greater, the effect of diffusing the metal elements included in the electrode layers 131b and 132b to the internal electrodes 121 and 122, the effect of improving connectivity between the internal electrodes 121 and 122 and the external electrodes 131 and 132, and the effect of suppressing penetration of hydrogen into the body 110 may be insufficient.

Therefore, the 30 μm×5 μm region selected from the cross-section of the first base plating layer 131a in the first and second directions preferably includes 3 or more Ni grains having a grain size of 4 μm or greater, more preferably, 5 or more Ni grains, and even more preferably, 9 or more Ni grains.

In an exemplary embodiment, as the 30 μm×5 μm region selected from the cross-section of the first base plating layer 131a in the first and second directions includes two or more Ni grains having a grain size of 5 μm or more, the effect of improving connectivity, the effect of suppressing diffusion, and the effect of suppressing hydrogen penetration may be further improved. More preferably, the 30 μm×5 μm region selected from the cross-section of the first base plating layer 131a in the first and second directions may include 3 or more Ni grains having a grain size of 5 μm or more, and more preferably, 5 or more.

In an exemplary embodiment, a maximum size of the Ni grains included in the 30 μm×5 μm region selected from the cross-section of the first base plating layer 131a in the first and second directions may be 7 μm or greater, more preferably, 9 μm or greater, and even more preferably, 10 μm or greater.

In an exemplary embodiment, as an average size of the Ni grains included in the 30 μm×5 μm region selected from the cross-section of the first base plating layer 131a in the first and second directions is 3 μm or greater, the effect of improving connectivity, the effect of suppressing diffusion, and the effect of suppressing hydrogen penetration may be further improved. More preferably, the average size of the Ni grains included in the 30 μm×5 μm region selected from the cross-section of the first base plating layer in the first and second directions may be 3.5 μm or greater, and more preferably, 4 or greater.

Meanwhile, the 30 μm×5 μm region selected from the cross-section of the first base plating layer 131a in the first and second directions has a size of 30 μm in the first direction, and referring to FIG. 6, it may be a region within 5 μm from an interface between the first base plating layer 131a and the first electrode layer 131b. Since Ni grains having a small grain size may be disposed in a region adjacent to the body, it may be preferable to observe in the region 5 μm from the interface between the first base plating layer and the first electrode layer in the second direction.

Meanwhile, a method for controlling the size of the Ni grains included in the base plating layers 131a and 132a may not be particularly limited. As an example, Ni plating may be performed on the body to form the base plating layers 131a and 132a and a heat treatment may be performed before the formation of the electrode layers 131b and 132b, thereby controlling the size of the Ni grains, and the heat treatment may be performed at temperatures of 760° ° C. to 860° C.

A preferred example of a method for measuring the size of Ni grains is as follows. After the multilayer electronic component is polished to the center thereof in the third direction to expose the cross-section in the first and second directions, and the size of the Ni grains may be measured from an image scanned using a scanning electron microscope (SEM). At this time, in order to more clearly observe the Ni grains, regions having a size of about 10 μm are continuously scanned in the first direction, and then the images may be connected and a region of 30 μm×5 μm may be observed. The size of the Ni grains may be calculated as an average value of the major axis and the minor axis of the Ni grains, and the Ni grains observed partially included in the 30 μm×5 μm region are also considered to be included in the 30 μm×5 μm region, and a total grain size of the partially included Ni grains may be regarded as the size of Ni grains.

In an exemplary embodiment, an average size of the first base plating layer 131a in the second direction may be 5 μm or greater. That is, the average thickness of the first base plating layer 131a may be 5 μm or greater. If the average size of the first base plating layer in the second direction is less than 5 μm, Ni grains having a grain size of 4 μm or greater may not be sufficiently secured. Meanwhile, an upper limit of the average size of the first base plating layer 131a in the second direction may not be particularly limited, but may be 15 μm or less because a capacitance per unit volume of the multilayer electronic component may decrease if it is too thick. The average size of the first base plating layer 131a in the second direction may be an average thickness of the first base plating layer 131a.

The average size of the first base plating layer 131a in the second direction may be measured by polishing the multilayer electronic component to the center in the third direction to expose a cross-section in the first and second directions, and then from an image scanned using a scanning electron microscope (SEM). In addition, the average size of the first base plating layer 131a in the second direction may be measured at the central portion in the first direction, and may be a value obtained by averaging sizes of the first base plating layer 131 in the second direction measured at 10 points equally spaced apart in the first direction.

Meanwhile, the method of forming the base plating layers 131a and 132a may not be particularly limited. For example, in order to form the base plating layers 131a and 132a on the surface of the body 110, Pd seeds may be formed at the end portions of the internal electrodes 121 and 122, and then the base plating layer may be grown from the Pd seeds to form the base plating layer. As the Pd seed is used, the base plating layers 131a and 132a may include Pd in region P2 adjacent to the internal electrodes 121 and 122, and the internal electrodes 121 and 122 may include Pd in region P1 adjacent to the base plating layers 131a and 132a. As Pd is included in the region P1 and/or P2, the effect of improving the connectivity between the internal electrode and the external electrode of the present disclosure, the effect of suppressing diffusion of elements included in the electrode layer into the internal electrode, and the effect of suppressing penetration of hydrogen into the body may be further improved.

Accordingly, in an exemplary embodiment, the first base plating layer 131a may include Pd in the region P2 adjacent to the first internal electrode 121. Also, in an exemplary embodiment, the first internal electrode 121 may include Pd in a region P1 adjacent to the first base plating layer 131a. In this case, Pd included in P1 and P2 may exist in the form of an alloy with Ni.

In an exemplary embodiment, an area ratio occupied by Ni grains in the cross-sections of the first and second base plating layers 131a and 132a in the first and second directions may be 90% or more. Accordingly, the effect of improving the connectivity between the internal electrodes 121 and 122 and the external electrodes 131 and 132 of the present disclosure, the effect of suppressing diffusion of elements included in the electrode layers 131b and 132b into the internal electrodes 121 and 122, and the effect of suppressing penetration of hydrogen into the body may be further improved. More preferably, the area ratio occupied by the Ni grains in the cross-sections of the first and second base plating layers in the first and second directions may be 95% or more, and more preferably 98% or more. That is, the first and second base plating layers may most preferably be formed of Ni grains except for some diffusion elements and unavoidable impurities.

In an exemplary embodiment, when the size of the first base plating layer 131a in the second direction measured at the center of the body 110 in the first direction is T1, and the size of the first base plating layer 131 in the second direction measured at a portion in which the first outermost internal electrode in the first direction and the first base plating layer 131a are connected to each other is T1', T1'/T1 may be 0.8 or greater and 1.1 or less. This is because the base plating layers 131a and 132a may have a uniform thickness as they are formed by a plating method.

In an exemplary embodiment, the base plating layers 131a and 132a may be Ni plating layers including Ni as a major component.

In an exemplary embodiment, the first and second base plating layers 131a and 132a may be disposed between an extension line E1 of the first surface and an extension line E2 of the second surface. When the first and second base plating layers 131a and 132a extend to the first surface beyond the extension line E1 of the first surface or extend to the second surface beyond the extension line E2 of the second surface, since the internal electrodes are generally not disposed on the first and second surfaces, and thus, bonding force between the base plating layers 131a and 132a and the body 110 may weaken and problems, such as delamination, may occur.

It may be more preferable that the first and second base plating layers 131a and 132a are not disposed at the corner of the body, but is not limited thereto.

The electrode layers 131b and 132b may include conductive metal and glass. The conductive metal included in the electrode layers 131b and 132b may serve to secure electrical connectivity and glass may serve to improve bonding force with the body.

The conductive metal included in the electrode layers 131b and 132b may be formed using any material as long as it has electrical conductivity, and a specific material may be determined in consideration of electrical characteristics, structural stability, and the like. For example, metals included in the electrode layers 131b and 132b may include one or more selected from the group consisting of Nickel (Ni), copper (Cu), palladium (Pd), silver (Ag), gold (Au), platinum (Pt), tin (Sn), tungsten (W), titanium (Ti), and alloys thereof.

However, when the conductive metal included in the electrode layers 131b and 132b is Cu, the effect of suppressing diffusion of elements included in the electrode layers 131b and 132b into the internal electrode according to the arrangement of the base plating layer may be more remarkable. Accordingly, in an exemplary embodiment, the conductive metal included in the first and second electrode layers 131b and 132b may be Cu.

In addition, when the conductive metal included in the first and second electrode layers 131b and 132b is Cu, a Ni—Cu alloy layer may be disposed in the interface between the base electrode layers 131a and 132a and the electrode layers 131b and 132b. Therefore, in an exemplary embodiment, the conductive metal included in the first and second electrode layers 131b and 132b may be Cu, and the Ni—Cu alloy layer may be disposed in the interface between the first base electrode layer and the first electrode layer and in the interface between the second base electrode layer and the second electrode layer.

In an exemplary embodiment, the first and second electrode layers 131b and 132b may extend to at least a portion of the first and second surfaces. Since the first and second electrode layers 131b and 132b include glass, they have excellent bonding strength with the body 110, and as the first and second electrode layers 131b and 132b extend to at least a portion of the first and second surfaces, they are disposed in a form to cover the first and second base electrode layers 131a and 132a, so that bonding force between the body 110 and the external electrodes 131 and 132 may be improved.

The electrode layers 131b and 132b may include only a first layer including a conductive metal and glass. However, the present disclosure is not limited thereto, and in an exemplary embodiment, the electrode layers 131b and 132b may have a multilayer structure.

For example, the first and second electrode layers 131b and 132b may include a first layer including a conductive metal and glass and a second layer disposed on the first layer and including a conductive metal and resin. As the second layer including a conductive metal and a resin is included, the bending strength of the multilayer electronic component may be improved.

The conductive metal included in the second layer is not particularly limited as long as it is a material that may be electrically connected to the first layer, and may include one or more selected from the group consisting of Nickel (Ni), copper (Cu), palladium (Pd), silver (Ag), gold (Au), platinum (Pt), tin (Sn), tungsten (W), titanium (Ti), and alloys thereof.

The conductive metal included in the second layer may include at least one of spherical powder and flake powder. That is, the conductive metal included in the second layer may be formed of only flake powder, only spherical powder, or may be a mixture of flake powder and spherical powder. Here, the spherical powder may also include a shape that is not perfectly spherical, and may include a shape in which, for example, a length ratio between a major axis and a minor axis (major axis/minor axis) is 1.45 or less. Flake powder may refer to powder having a flat and elongated shape, and for example, the length ratio of the major axis to the minor axis (major axis/minor axis) may be 1.95 or more but is not particularly limited. The lengths of the major and minor axes of the spherical powder and the flake powder may be measured from an image obtained by scanning a cross-section (L-T cross-section) of the multilayer electronic component in the first and second directions cut at the central portion in the third direction with a scanning electron microscope (SEM).

The resin included in the second layer serves to secure bondability and absorb shock. The resin included in the second layer is not particularly limited as long as it has bondability and shock absorption and may be mixed with conductive metal powder to form a paste. For example, the resin may include one or more selected from among epoxy resin, acrylic resin, ethyl cellulose, and the like.

Also, the second layer may include a plurality of metal particles, an intermetallic compound, and a resin. Since the second layer includes the intermetallic compound, electrical connectivity with the first layer may be further improved. The intermetallic compound may serve to improve electrical connectivity by connecting a plurality of metal particles, and may serve to surround and connect a plurality of metal particles to each other.

In this case, the intermetallic compound may include a metal having a melting point lower than a curing temperature of the resin. That is, since the intermetallic compound includes a metal having a melting point lower than the curing temperature of the resin, the metal having a melting point lower than the curing temperature of the resin may be melted during a drying and curing process and form an intermetallic compound with some of the metal particles to enclose the metal particle. In this case, the intermetallic compound may preferably include a metal having a low melting point of 300° C. or less.

In an exemplary embodiment, the second layer may include Sn. During the drying and curing process, Sn is melted, and the molten Sn wets high-melting-point metal particles, such as Ag, Ni, or Cu, by a capillary phenomenon, and reacts with some of the Ag, Ni, or Cu metal particles to form intermetallic compounds, such as $Ag_3Sn$, $Ni_3Sn_4$, $Cu_6Sn_5$, $Cu_3Sn$. Ag, Ni, or Cu that did not participate in the reaction remains in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

The external electrodes 131 and 132 may include plating layers 131c and 132c disposed on the electrode layers 131b and 132b. The first external electrode 131 may include a first plating layer 131c disposed on the first electrode layer 131b, and the second external electrode 132 may include a second plating layer 132c disposed on the second electrode layer 132b.

The plating layers 131c and 132c serve to improve mounting characteristics. The type of the plating layers 131c and 132c is not particularly limited, may be a plating layer including at least one of Ni, Sn, Pd, and alloys thereof, and may be formed of a plurality of layers.

As a more specific example of the plating layers 131c and 132c, the plating layers 131c and 132c may be Ni plating layers or Sn plating layers, may have a form in which an Ni plating layer and an Sn plating layer are sequentially formed, or may have a form in which an Sn plating layer, an Ni plating layer, and an Sn plating layer are sequentially formed. In addition, the plating layers 131c and 132c may include a plurality of Ni plating layers and/or a plurality of Sn plating layers.

In an exemplary embodiment, the first and second plating layers 131c and 132c may include Ni plating layers, and an average grain size of Ni grains included in the Ni plating layers of the first and second plating layers 131c and 132c may be smaller than an average grain size of Ni grains included in the first and second base plating layers 131c and 132c. In the case of the base plating layers 131c and 132c, it is necessary to perform a separate heat treatment in order to secure a large grain size of the Ni grains, but in the case of the Ni plating layers included in the first and second plating layers 131c and 132c, it is not necessary to perform a separate heat treatment, and thus, the average grain size of the Ni grains included in the Ni plating layer of the first and second plating layers 131c and 132c may be smaller than the average grain size of the Ni grains included in the first and second base plating layers 131c and 132c.

The size of the multilayer electronic component 100 may not be particularly limited.

However, in order to achieve miniaturization and high capacitance at the same time, the number of laminations needs to be increased by reducing the thicknesses of the dielectric layer and the internal electrodes, and therefore, the reliability improvement effect according to the present disclosure may be more remarkable in the multilayer electronic component 100 having a size of 1005 (length×width, 1.0 mm×0.5 mm) or less.

Therefore, considering manufacturing errors, external electrode sizes, etc., when the length of the multilayer electronic component 100 is 1.1 mm or less and the width is 0.55 mm or less, the reliability improvement effect according to the present disclosure may be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Example

Ceramic green sheets coated with internal electrode paste were stacked, cut, and fired to form a body, Pd seeds were formed at the end portions of internal electrodes exposed to the body surface, and an Ni plating layer, which is a base plating layer, was grown from the Pd seed using an electrolytic plating method. Thereafter, in Inventive Examples 1 and 2, a heat treatment was performed on the base plating layer at 780° C., and in Comparative Examples, heat treatment was not performed. Thereafter, a paste including conductive metal and glass was applied on the base plating layer and fired to form an electrode layer to manufacture sample chips.

Figure 7:
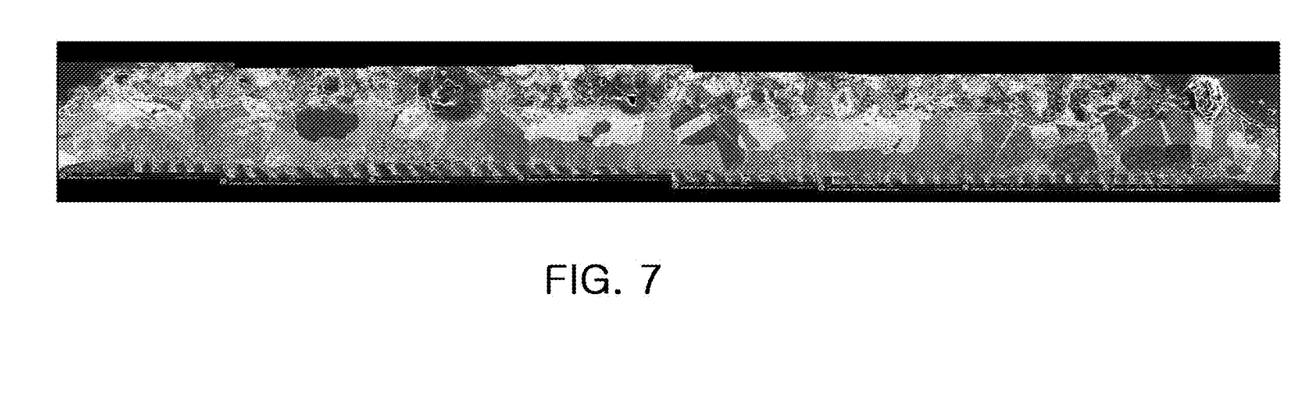
FIG. 7 is a scanning electron microscope (SEM) image of cross-sections of Inventive Example 1 in first and second directions.
Figure 8:
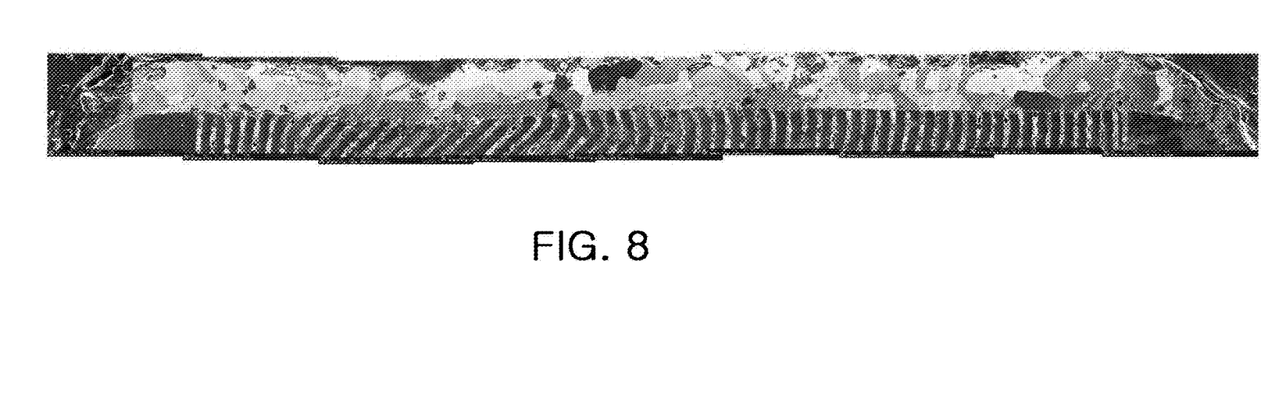
FIG. 8 is a scanning electron microscope (SEM) image of cross-sections of Inventive Example 2 in first and second directions.

Sample chips of Comparative Example and Inventive Examples 1 and 2 were polished to the center in the third direction to expose cross-sections in the first and second directions, and then regions having a size of about 10 μm in the first direction were continuously scanned with a scanning electron microscope. Thereafter, the images were connected as shown in FIGS. 7 and 8 to measure grain sizes of Ni grains included in the 30 μm×5 μm region of the base plating layer, and the results are shown in Table 1 below.

As for radiation cracks, 200 samples of each of Comparative Example and Inventive Example 1 and 2 were prepared and polished to the center in the third direction to expose cross-sections in the first and third directions, and whether cracks occurred were checked with naked eyes and the number of cracked sample chips was described.

TABLE 1

| Classification | Average grain size (μm) | Maximum grain size (μm) | Number of grains having grain size of 4 μm or greater | Number of grains having grain size of 5 μm or greater | Radiation cracks |
|---|---|---|---|---|---|
| Comparative Example | 2.932 | 6.68 | 1 | 1 | 20/200 |
| Inventive Example 1 | 4.836 | 10.93 | 9 | 5 | 0/200 |
| Inventive Example 2 | 4.013 | 12.14 | 9 | 6 | 0/200 |

In the case of Comparative Example 1, it can be confirmed that many radiation cracks occurred due to the small diameter of the Ni grains included in the 30 μm×5 μm region of the base plating layer.

Meanwhile, Inventive Examples 1 and 2 included three or more Ni grains having a grain size of 4 μm or greater in the 30 μm×5 μm region of the base plating layer, and it was confirmed that radiation cracks did not occur.

Meanwhile, it was difficult to measure a hydrogen diffusion coefficient in the base plating layer of the sample chip, so a plating layer sample having a size of 5 cm×5 cm was separately prepared and measured. Test No. 1 is an Ni plating layer manufactured by electrolytic plating, Test No. 2 is an Ni plating layer which was manufactured by electrolytic plating and heat-treated, and Test No. 3 is an Ni plating layer which was formed on a Pd seed and then heat-treated. Thereafter, an effective hydrogen diffusion coefficient was measured according to the ISO 17081 standard test method and is shown in Table 2 below.

TABLE 2

| Test No. | Thickness (μm) | Effective hydrogen diffusivity (m$^2$/s) |
|---|---|---|
| 1 | 56 | $1.1*10^{-12}$ |
| 2 | 56 | $1.2*10^{-13}$ |
| 3 | 67 | $6.3*10^{-14}$ |

In Table 2, it can be seen that Test No. 2, which has undergone a heat treatment, has a lower effective hydrogen diffusion coefficient than Test No. 1, and Test No. 3, in which a Ni plating layer was formed on Pd seed, has the lowest effective hydrogen diffusion coefficient.

As one of the various effects of the present disclosure, the reliability of the multilayer electronic component may be improved by disposing the base plating layer between the internal electrode and the electrode layer and controlling the size of the Ni grains of the base plating layer.

As one of the various effects of the present disclosure, radiation cracks may be suppressed by disposing the base plating layer between the internal electrode and the electrode layer and controlling the grain size of Ni grains in the base plating layer.

As one of the various effects of the present disclosure, connectivity between internal electrodes and external electrodes may be improved.

As one of the various effects of the present disclosure, penetration of hydrogen into the body may be suppressed.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed in a first direction with the dielectric layer interposed therebetween and including first and second surfaces of the body facing in the first direction, third and fourth surfaces of the body connected to the first and second surfaces and facing in a second direction, and fifth and sixth surfaces of the body connected to the first to fourth surfaces and facing in a third direction;
a first external electrode including a first base plating layer disposed on the third surface and connected to the first internal electrode and a first electrode layer disposed on the first base plating layer; and
a second external electrode including a second base plating layer disposed on the fourth surface and connected to the second internal electrode and a second electrode layer disposed on the second base plating layer,
wherein the first and second electrode layers include a conductive metal and glass, and
a 30 μm×5 μm region selected from a cross-section of the first base plating layer in the first and second directions includes Ni grains, wherein three or more of the Ni grains have a grain size of 4 μm or greater.

2. The multilayer electronic component of claim 1, wherein the 30 μm×5 μm region includes two or more of the Ni grains having a grain size of 5 μm or greater.

3. The multilayer electronic component of claim 1, wherein an average grain size of the Ni grains included in the 30 μm×5 μm region is 3 μm or greater.

4. The multilayer electronic component of claim 1, wherein the 30 μm×5 μm region has a size of 30 μm in the first direction, and is a region within 5 μm from an interface between the first base plating layer and the first electrode layer in the second direction.

5. The multilayer electronic component of claim 1, wherein an average size of the first base plating layer in the second direction is 5 μm or greater.

6. The multilayer electronic component of claim 1, wherein the first base plating layer includes Pd in a region adjacent to the first internal electrode.

7. The multilayer electronic component of claim 1, wherein the first internal electrode includes Pd in a region adjacent to the first base plating layer.

8. The multilayer electronic component of claim 1, wherein, in the cross-sections of the first and second base plating layers in the first and second direction, an area ratio of the Ni grains is 90% or more with respect to a total area of the cross-sections of the first and second base plating layers.

9. The multilayer electronic component of claim 1, wherein the first and second base plating layers include Ni plating layers.

10. The multilayer electronic component of claim 1, wherein the first and second base plating layers are disposed between an extension line of the first surface and an extension line of the second surface,
wherein each of the extension lines of the first and second surfaces each surface is a line extending based on a flat portion of the first and second surfaces.

11. The multilayer electronic component of claim 1, wherein T1'/T1 is 0.8 or more and 1.1 or less, in which T1 is a size of the first base plating layer in the second direction measured at a center of the body in the first direction, and T1' is a size of the first base plating layer in the second direction measured in an area at which an outermost first internal electrode disposed in the first direction and the first base plating layer are connected.

12. The multilayer electronic component of claim 1, wherein the conductive metal included in the first and second electrode layers comprises Cu.

13. The multilayer electronic component of claim 1, wherein the first and second electrode layers extend to and disposed on at least a portion of the first and second surfaces.

14. The multilayer electronic component of claim 1, wherein the first and second electrode layers include a first layer including the conductive metal and glass and a second layer disposed on the first layer and including the conductive metal and a resin.

15. The multilayer electronic component of claim 1, wherein
the first external electrode further includes a first plating layer disposed on the first electrode layer, and
the second external electrode further includes a second plating layer disposed on the second electrode layer.

16. The multilayer electronic component of claim 15, wherein
the first and second plating layers include an Ni plating layer,
an average grain size of an Ni grain included in the Ni plating layers of the first and second plating layer is smaller than an average grain size of an Ni grain included in the first and second base plating layers.

17. A multilayer electronic component comprising:
a body including a dielectric layer and first and second internal electrodes alternately disposed in a first direction with the dielectric layer interposed therebetween and including first and second surfaces of the body facing in the first direction, third and fourth surfaces of the body connected to the first and second surfaces and facing in a second direction, and fifth and sixth surfaces of the body connected to the first to fourth surfaces and facing in a third direction;
a first external electrode including: a first base plating layer disposed on the third surface and connected to the first internal electrode; a first electrode layer disposed on the first base plating layer; and a first plating layer disposed on the first electrode layer,
a second external electrode including: a second base plating layer disposed on the fourth surface and connected to the second internal electrode; a second electrode layer disposed on the second base plating layer; and a second plating layer disposed on the second electrode layer,
wherein an average grain size of an Ni grain included in the Ni plating layers of the first and second plating layer is smaller than an average grain size of an Ni grain included in the first and second base plating layers.

18. The multilayer electronic component of claim 17, wherein the first and second electrode layers include a conductive metal and glass.

19. The multilayer electronic component of claim 17, wherein a 30 μm×5 μm region selected from a cross-section of the first base plating layer in the first and second directions includes the Ni grains, wherein three or more of the Ni grains have a grain size of 4 μm or greater.

20. The multilayer electronic component of claim 17, wherein the 30 μm×5 μm region includes two or more of the Ni grains having a grain size of 5 μm or greater.

21. The multilayer electronic component of claim 17, wherein an average grain size of the Ni grains included in the 30 μm×5 μm region is 3 μm or greater.

* * * * *